United States Patent [19]

Pastor

[11] Patent Number: 4,536,256

[45] Date of Patent: Aug. 20, 1985

[54] SOLVENT RECOVERY APPARATUS

[75] Inventor: Manuel G. Pastor, Berkeley, Calif.

[73] Assignee: Recyclene Products, Inc., San Jose, Calif.

[21] Appl. No.: 516,008

[22] Filed: Jul. 20, 1983

[51] Int. Cl.³ .............................................. B01D 3/02
[52] U.S. Cl. .......................... 202/164; 159/DIG. 32; 159/DIG. 41; 202/235; 202/267 R
[58] Field of Search ................ 202/182, 163, 168–170, 202/232, 235, 267 R, 164, 83; 203/86, 99, 100, DIG. 11, DIG. 22; 134/10; 159/DIG. 10, DIG. 33, DIG. 41, DIG. 32

[56] References Cited

U.S. PATENT DOCUMENTS

| | | | |
|---|---|---|---|
| 3,127,300 | 3/1964 | Maggio | 159/32 |
| 3,890,988 | 6/1975 | Lee | 210/167 |
| 4,052,267 | 10/1977 | McFee | 202/185 B |
| 4,320,699 | 3/1982 | Binks | 99/349 |

Primary Examiner—Frank Sever
Attorney, Agent, or Firm—Townsend and Townsend

[57] ABSTRACT

A solvent recovery apparatus including a housing having an open top tank therewithin for receiving a flexible bag. A bag holder member is removably mounted within the bag, and the holder member shapes the bag to hold it in an open condition for receiving dirty solvent directed into the tank. The holder member urges the upper edge of the bag against the inner surface of the tank so that substantially no solvent can migrate into the space between the bag and the tank. The tank has a space for receiving heating oil below a bottom thereof so that heat can be imparted to the contents of the bag to evaporate the solvent therewithin. Baffle structure in the oil causes the oil to circulate as the oil is heated by a resistance heater in the space. A quench coil below the bottom of the tank and above the oil receives a coolant for heating the liquid and solid contaminants left in the bag after evaporation of the solvent to minimize the delay in waiting for the contaminants to cool before removing the bag from the tank. A reservoir adjacent to the tank receives clean solvent in liquid form and has a cooling coil therewithin to inhibit any tendency for the solvent to evaporate in the reservoir.

30 Claims, 12 Drawing Figures

SOLVENT RECOVERY APPARATUS

This invention relates to improvements in the recovery of clean solvent from dirty solvent and, more particularly, to improved solvent recovery apparatus having a construction permitting more efficient recovery of solvent than has been possible with existing equipment.

BACKGROUND OF THE INVENTION

In U.S. patent applications Ser. No. 485,496, filed on Apr. 22, 1983, now U.S. Pat. No. 4,457,805, there is disclosed a solvent recovery technique in which a flexible bag is removably received within a tank and the interior of the tank is heated after contaminated solvent has been directed into the bag. Upon being heated, the solvent in the bag evaporates and is collected in a reservoir after being condensed. The contaminants are left in the bag. By removal of the bag from the tank, the contaminants can be discarded.

While the solvent recovery technique disclosed in the above patent application has been found satisfactory, it has been found that improvements in the technique can be adopted to make recovery of solvent more efficient. The present invention is directed to such improvements and includes a number of structural features which simplifies the recovery of solvent yet assures maximum yield of solvent without increasing the cost of equipment and labor.

SUMMARY OF THE INVENTION

The present invention is directed to an improved solvent recovery apparatus in which an open top tank removably receives a flexible bag, with the bag being shaped by a basket-like member removably placed within the bag itself. The bag, once in the tank and shaped by the member, receives contaminated solvent which is heated by heating means coupled with the tank for heating the interior thereof. Solvent vapor resulting from the heating action is directed out of the bag and through a condenser to liquefy the solvent, and the liquid solvent is then directed to a reservoir and held therein until ready for reuse.

The basket-like member which shapes the bag is simple and rugged in construction. It also serves a second purpose of holding the upper margin of the bag against the inner surface of the tank to inhibit any migration of solvent into the space between the tank and the bag. The member is removable from the bag even when contaminants are in the bag, and a new bag can readily be placed on the member for the next solvent recovery operation.

Other improvements include a quench coil coupled with the tank for receiving coolant to cool the contents of the bag after the solvent has been evaporated therefrom. This permits the bag to be more quickly removed from the tank to increase the speed of operation of the solvent recovery technique, whereby the greater volume of solvent can be recovered per unit time.

The heating means for the tank is preferably a volume of heating oil in the space below a bottom wall of the tank. An immersion heater of the resistance type is used for heating the oil which in turn is in heat exchange relationship to the contents of a bag within the tank.

Another feature of the present invention, if heating oil is used, is a baffle assembly in the space containing the heating oil. This baffle assembly serves to cause circulation of the oil whereby the oil is more uniformly heated than without the baffles.

Still another feature of the invention is the use of a cooling coil in the reservoir which receives clean solvent for cooling the solvent. This feature minimizes the tendency for the solvent to evaporate in the reservoir, thereby assuring that the solvent will always be ready in liquid form to be removed from the reservoir.

The primary object of the present invention is to provide an improved solvent recovery apparatus having a number of features which render the recovery of solvent more efficient than has been possible yet the solvent recovered from the use of the apparatus is clear of contaminants to thereby provide a cost-efficient means for recovering solvent for reuse in any one of a number of different applications.

Other objects of this invention will become apparent as the following specification progresses, reference being had to the accompanying drawings for an illustration of several embodiments of the invention.

In the Drawings:

FIG. 5 is a view similar to FIG. 3 but showing a bag holder for the embodiment of FIG. 2a;

Figure 2:
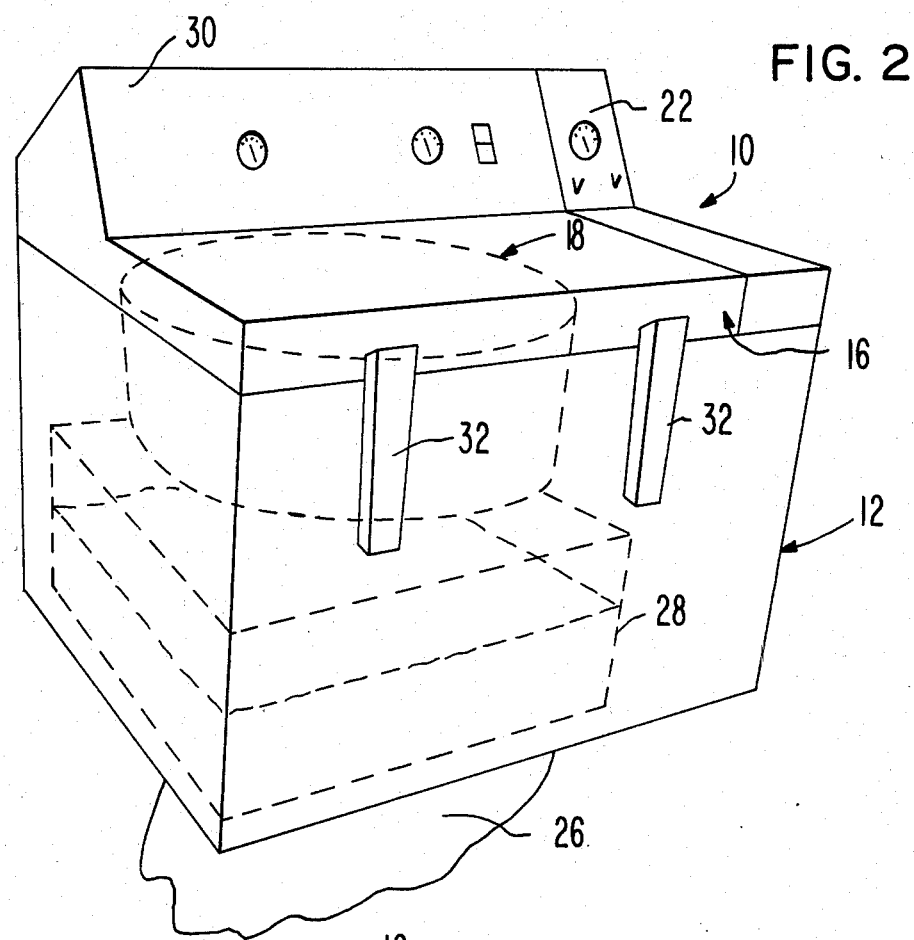
FIG. 2 is a view similar to FIG. 1 but showing the apparatus schematically and with the lid closed.
Figure 1:
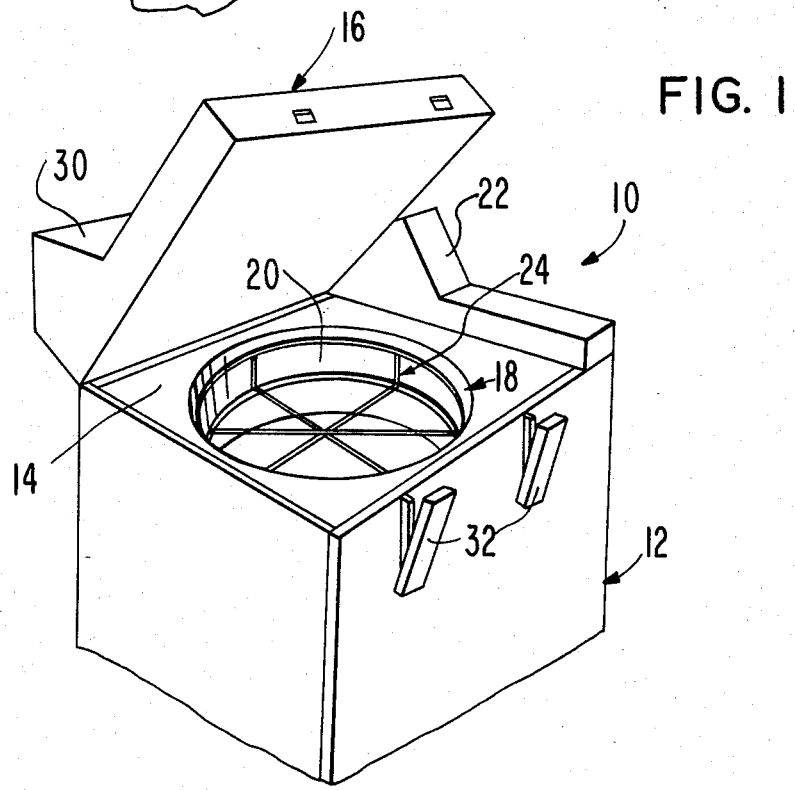
FIG. 1 is a fragmentary, perspective view of a solvent recovery apparatus having an improved holder for a plastic bag in the apparatus, a lid of the apparatus being open to show the way access is obtained to the solvent receiving bag in the apparatus.

A first embodiment of the apparatus of the present invention, shown in FIGS. 1 and 2, is broadly denoted by the numeral 10 and includes a housing 12 having an upper surface 14 and a lid 16 pivotally coupled to the upper end of the housing for opening and closing the open top of a tank 18 which receives a bag 20 into which solvent to be reclaimed is directed. The housing has a control panel 22 above upper surface 14 for controlling the operation of the apparatus. Moreover, the tank 18 is adapted to receive an improved wire basket-like member 24 which is placed inside bag 20 to shape the bag and to hold the upper margin of the bag against the inner surface of the tank. Member 24 will be described with respect to FIGS. 3 and 4.

Housing 12 typically has a shape of the type shown in FIG. 2. The height of housing 12 is sufficient so that access to tank 18 can be had by a person standing on the floor 26 on which housing 12 is supported.

Tank 18 is relatively shallow and has a tapering side wall 27 (FIG. 7) with the upper end of the tank being of a greater diameter than the lower end of the tank. The housing has a means (not shown) for directing dirty solvent into tank 18 so that, upon being heated by heating means below the tank, pure solvent can be evaporated and drawn off from the tank to a reservoir 28 in housing 12 below the tank for storage until ready for use. The contaminants, both liquids and solids, which remain in the bag 20 are removed from the tank by lifting the bag out of the tank. The bag can then be discarded and replaced with a clean bag so that the process of reclaiming solvent can be repeated.

Lid 16 has a control panel 30 which is generally aligned with panel 22 on housing 12. The instruments on panels 22 and 30 are used in the operation of apparatus 10. Lid 16 is releasably secured to housing 12 by a pair of hasps 32 which are conventional in construction.

Figure 3:
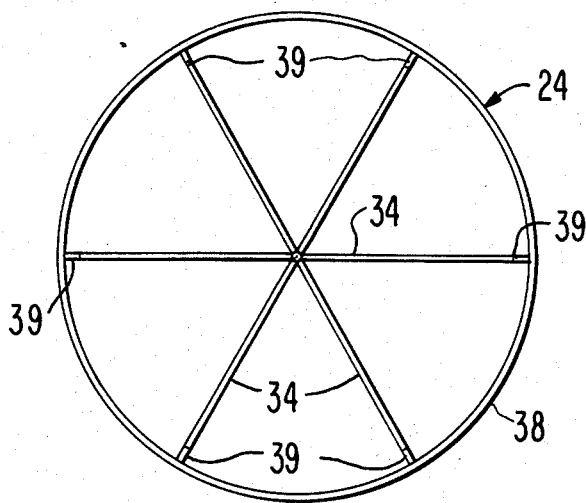
FIG. 3 is a top plan view of one embodiment of the improved bag holder for the embodiment of FIGS. 1 and 2.
Figure 4:
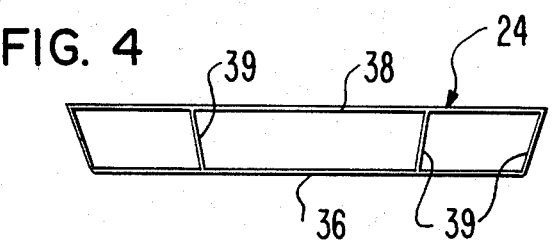
FIG. 4 is a side elevational view of the holder of FIG. 3, showing the bag in the holder.

The basket-like member 24 in tank 18 is shown in more detail in FIGS. 3 and 4. Member 24 is made of rigid wire or rod stock and includes a number of bottom, crossed segments 34 secured at their outer ends by a lower circular segment 36. An upper circular segment 38 is connected by inclined segments 39 to lower segment 36.

Bag 20 is exteriorly of member 24 as shown in FIG. 4 so that member 24 shapes bag 20 when the bag is in tank 18. Bag 20 can be formed from a single sheet of heat resistant plastic material, such as nylon, Teflon or the like. The sheet, when placed over the tank and engaged from above by member 24 will be forced into the tank and will assume a bag-like configuration as shown in FIG. 4, notwithstanding the fact that the sheet initially has a planar construction rather than a container-like construction. The side segments 39 of member 24, because they are inclined as shown in FIG. 4, cause the bag to be essentially forced into engagement with and essentially sealed against the inner surface 19 (FIG. 4) of tank 18; thus, solvent will have no substantial tendency to migrate around the open upper margin of bag 20 and into the tank exteriorly of the bag as might otherwise be the case if member 24 were not present or if member 24 were to have another configuration from that shown in FIGS. 3 and 4.

Figure 2A:
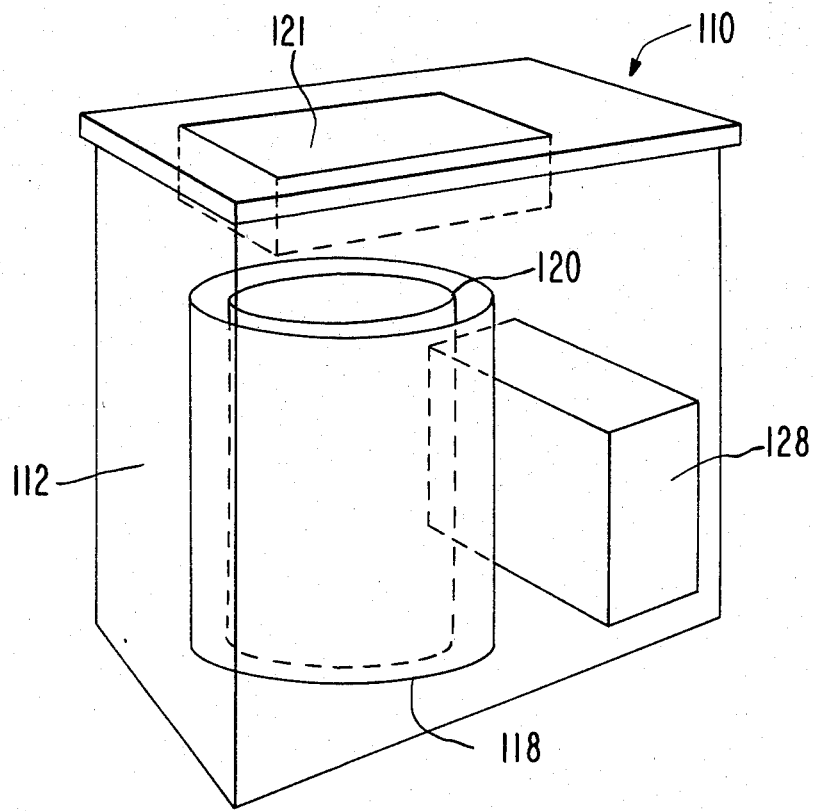
FIG. 2a is a view similar to FIG. 2 but showing a modified version of the apparatus.

The apparatus of the present invention can have a slightly modified configuration as shown in FIG. 2a, such embodiment being denoted by the numeral 110. Apparatus 110 includes a housing 112 having a generally cylindrical tank 118 below an open top sink 121 which communicates with the tank for directing solvent thereinto. Tank 118 has a greater depth but a smaller diameter than tank 18 shown in FIGS. 1 and 2. Moreover, housing 112 has a reservoir 128 at one side of the tank for receiving clean solvent evaporated from tank 118 and condensed into a liquid form before the solvent reaches the reservoir.

Figure 5:
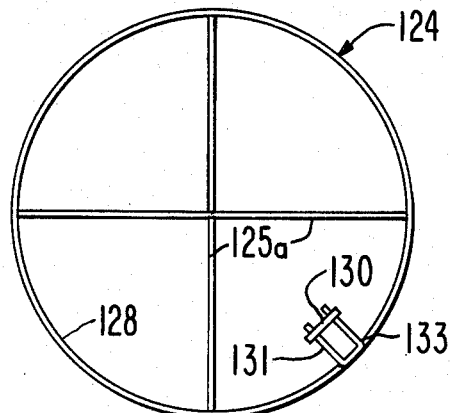
Figure 6:
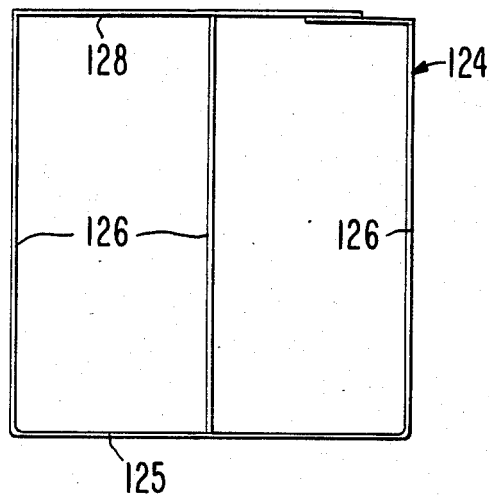
FIG. 6 is a side elevational view of the bag holder of FIG. 5.

Dirty solvent is directed first into sink 121 and then into a bag in tank 118. The bag in this tank can be of the same material as the bag 20 in apparatus 10. A basket-like bag holding member 124 is used with tank 118, member 124 being shown in detail in FIGS. 5 and 6.

Holder 124 includes a bottom, circular segment 125, a pair of crossed bottom segments 125a a number of upright wire segments 126, and an upper split ring segment 128. A clip 130 is used to releasably join the transverse ends 131 and 133 of split ring segment 128 to decrease the diameter of the segment to allow insertion and removal of member 124 and its bag from tank 118. Once the bag and member 124 are in tank 118, clip 130 is released, causing segments 131 and 133 to move toward each other due to the resilience of split ring segment 128, allowing the diameter of circular split ring segment 128 to increase and thereby expand, forcing the upper margin of the bag against the inner surface of the tank 118. This action effectively seals the upper margin of the bag against the interior surface of tank 118 so as to prevent the migration of solvent into the space between the tank and the outer surface of the bag.

Figure 7:
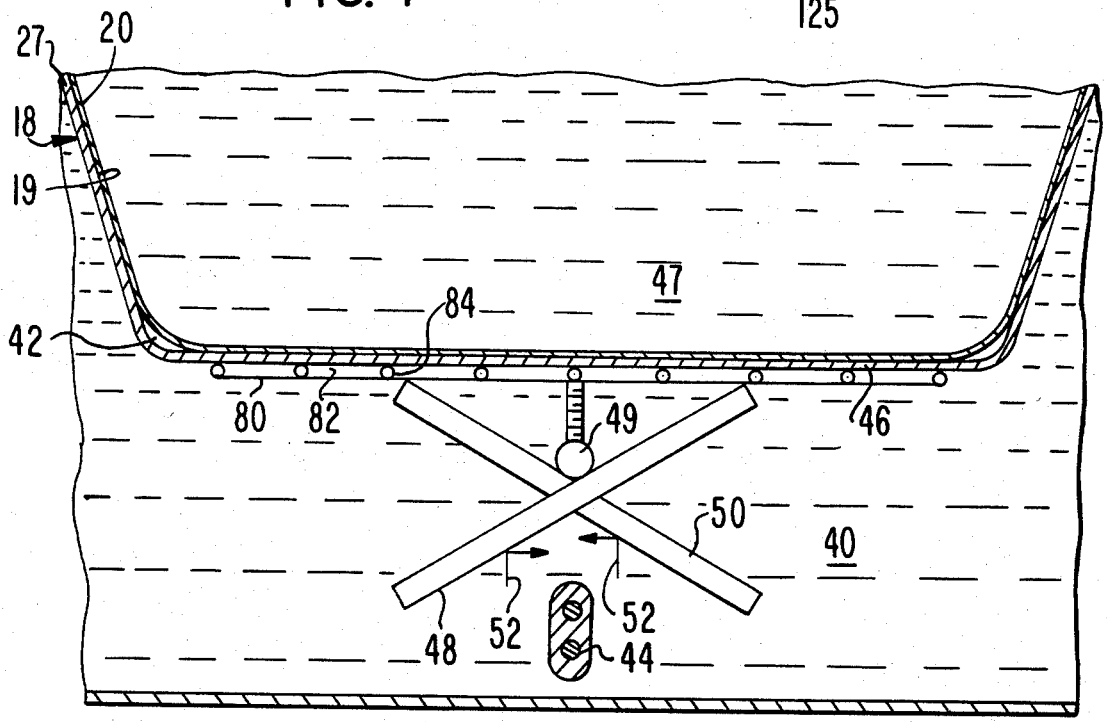
FIG. 7 is an enlarged, fragmentary, cross-sectional view of an assembly of baffle plates below the tank of embodiment of FIGS. 1 and 2.

Tank 18, shown in more detail in FIG. 7 has a lower space 40 below the interior 42 of the tank which receives the bag and member 24. Space 40 is filled with a heating oil of any suitable type. Heater means, such as an electrical resistance heater 44 is in space 40 for heating the oil so as to impart heat energy to the interior bottom 46 of the tank and then to the solvent 47 in bag 20. As the solvent heats up, it evaporates, leaving solid and liquid contaminants in the bag which can be removed from tank 18 and discarded after the solvent has been reclaimed.

Figure 8:
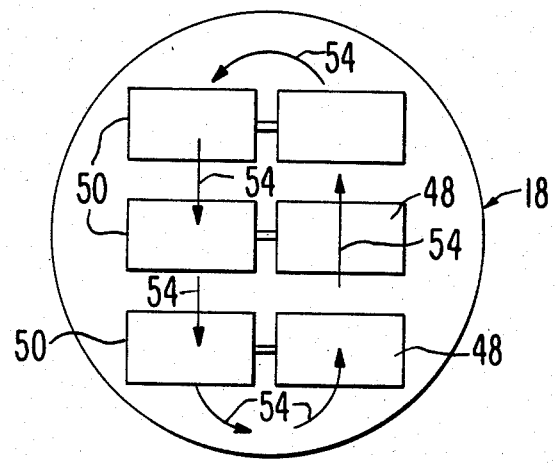
FIG. 8 is a schematic, top plan view of the baffle assembly of FIG. 7.

Tank 18 also has an assembly of pairs of baffles in space 40 above heater means 44. The purpose of the baffles is to impart a circular movement for the oil to distribute its heat energy more uniformly than is possible without the baffles. To this end, each pair of baffles is denoted by the numerals 48 and 50, and the baffles are inclined in opposite directions with respect to each other. Thus, as the oil is heated, the oil rises by convection and engages the undersides of the baffles and is then deflected laterally as shown by arrows 52 (FIG. 7). This deflection of the oil is in the same circular direction by all of baffles 48 and 50 so that there is a circulation of the oil indicated by arrows 54 (FIG. 8), this action causing the oil to more uniformly distribute its heat energy throughout the interior of space 40, thereby more efficiently heating the dirty solvent in bag 20 in tank 18.

Figure 9:
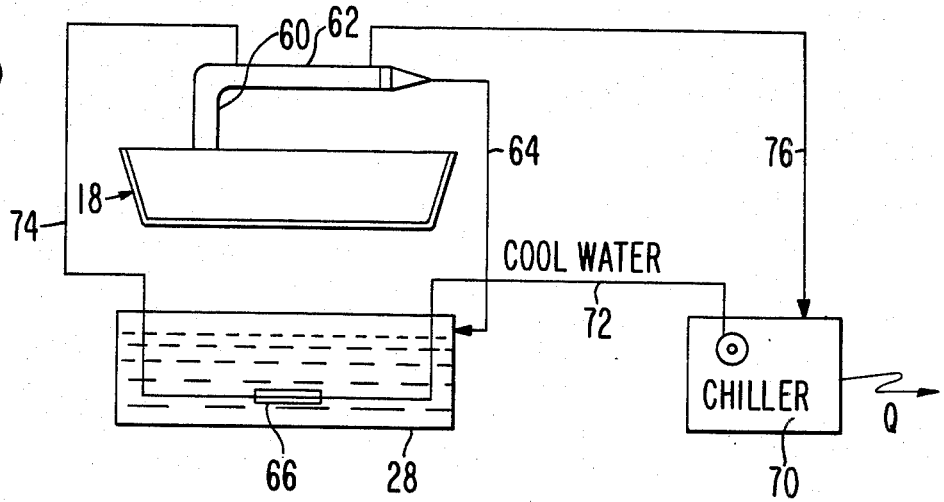
FIG. 9 is a schematic flow diagram of the embodiment shown in FIGS. 1 and 2.

FIG. 9 shows the way in which solvent is removed by evaporation from the bag in tank 18 and then removed to reservoir 28. A tube 60 receives evaporated solvent from tank 18 having bag 20 and member 24 therein. The vapor passes through a condenser 62 and then through a line 64 to reservoir 28. A coil 66 in reservoir 28 keeps the solvent from evaporating in reservoir 28 so that the liquid solvent is ready for removal at any time from the outlet 68 of reservoir 28.

A coolant, such as cool water, flows from a chiller 70, through a line 72 into and through coil 66, then out of the coil and reservoir 28 along a line 74 to condenser 62 for cooling the vapor from tank 18, causing the vapor to condense as it flows into and through line 64. A return line 76 from condenser 62 causes the coolant to return to chiller 70. The same flow diagram is used with apparatus 110 of FIG. 2a.

Tank 18 or tank 118 can be provided with a quench coil to cool the solid and liquid contaminants remaining in the bag in the respective tank so as to shorten the time necessary to removal of the bag from the tank. To this end, reference will be had to FIG. 7 to illustrate how tank 18 is provided with a quench coil.

Tank 18 has a secondary wall 80 below the interior bottom 46 of tank 18. Wall 80 is spaced below wall 46 to present a space 82 which receives quench coil 84. Quench coil 84 is coupled with some suitable source of a coolant, such as cool water which flows from a chiller exteriorly of the housing, such as in the manner shown in FIG. 9.

Figure 10:
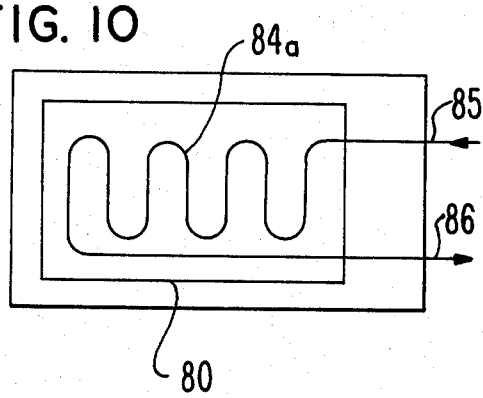
FIGS. 10 and 11 are schematic views showing two embodiments of a quench coil for the apparatus of the present invention.
Figure 11:
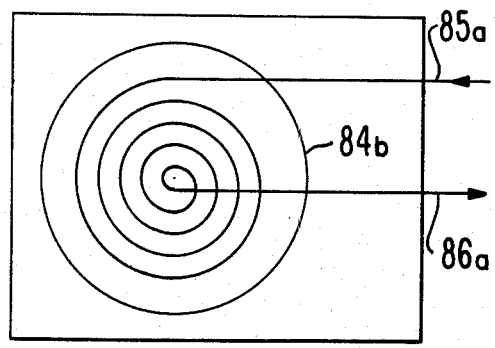

The configuration of the quench coil can be of any selected design. FIG. 10 shows a first embodiment of quench coil, broadly denoted by the numeral 84a. In this configuration, the tubes are generally in the form of a sine wave. Coolant enters inlet 85 and exits from outlet 86. In the embodiment of FIG. 11, the quench coil 84b is in the shape of a spiral coil and has inlets 85a and 86a. Other configurations of the quench coil can be used, if desired.

What is claimed is:

1. In a solvent recovery apparatus having means for providing a distilling mode and means for providing an emptying mode, including a tank, means for heating the interior of said tank, a plastic bag for placement within said tank interior such that the bag is designed, positioned and dimensioned for forming a substantially liquid tight barrier between contaminated solvent within said bag and said means for heating during said distilling mode and for enabling easy removal and disposal of said plastic bag with quantities of residue remaining in the bag from evaporation of said contaminated solvent during said emptying mode, the combination with said tank of:

means for shaping the bag and for holding said bag against the inner surface of said tank during said distilling mode and for supporting said bag with said quantities of residue during said emptying mode.

2. In apparatus as set forth in claim 1, wherein the shaping means includes structure engageable with the inner surface of the bag at the bottom, side and upper margin thereof to urge the bag against the inner surface of the tank.

3. In apparatus as set forth in claim 1, wherein the shaping means is removably received in the bag when the bag is in the tank.

4. In apparatus as set forth in claim 1, wherein the shaping means comprises a basket-like member.

5. In apparatus as set forth in claim 4, wherein said member is comprised of a number of generally rigid wire segments coupled together in a frame-like construction, the member being removably receivable received within the bag.

6. In apparatus as set forth in claim 4, wherein the tank has a tapered inner surface, the member having a number of inclined side segments substantially complemental to the inner surface of the tank.

7. In apparatus as set forth in claim 1, wherein the inner surface of the tank is substantially cylindrical, said shaping member comprising a basket-like member substantially complemental to the inner surface of the tank.

8. In apparatus as set forth in claim 7, wherein the upper end of the member comprises a split ring, and a clip for releasably holding the ends of the split ring away from each other, the split ring having a bias permitting the ring to expand to increase its diameter when the clip is released.

9. In apparatus as set forth in claim 1, wherein the tank has an interior bottom and a space below the bottom for receiving a heating oil, there being heating means within the space for heating the oil therewithin, and a baffle assembly in the space above the heating means for causing circulation of the oil when the oil is heated by the heating means.

10. In apparatus as set forth in claim 9, wherein said baffle assembly includes a pair of adjacent aligned baffles, one of the baffles being inclined at a first angle and the other baffle being inclined at a second angle, the angles being transverse to each other, whereby the oil in the space rising by convection will engage the lower surfaces of the baffles and be circulated along a circumferential path within the space.

11. In apparatus as set forth in claim 1, wherein the tank has a bottom, and a quench coil in heat exchange relationship to the bottom, said coil adapted to receive a coolant for cooling the contents of the bag after evaporation of the solvent therefrom.

12. In apparatus as set forth in claim 11, wherein is included a secondary wall below the bottom of the tank to present a space for receiving the quench coil.

13. In apparatus as set forth in claim 1, wherein is included a reservoir adjacent to the tank, there being means for receiving evaporated solvent from the tank and condensing the solvent, said condensed solvent being receivable in the reservoir, and a coolant coil in the reservoir to cool the solvent therein to inhibit the tendency of the solvent to evaporate in the reservoir.

14. In apparatus as set forth in claim 13, wherein the coil in the reservoir is coupled with said receiving and condensing means, whereby the coolant flowing through the coil in the reservoir will be used to condense the vapor leaving the tank.

15. In a solvent recovery apparatus having means providing a distillation mode and means for providing an emptying mode including a tank, means for heating the interior of the tank, a plastic bag for mounting within the interior of the tank such that the bag is designed, positioned and dimensioned for forming a substantially liquid-tight barrier between contaminated solvent within the bag and said heating means during the distillation mode and for enabling easy disposal of residue in the plastic bag during the emptying mode, the combination with said tank of:

means engageable with inner surface portions of the bottom and side of the bag for shaping the bag and holding it adjacent to the inner surface of the tank during said distillation mode and for allowing the bag containing said residue to be readily removed from the tank during said emptying mode.

16. In apparatus as set froth in claim 15, wherein the shaping means is engageable with the bag at the bottom, side and upper margin thereof to urge the bag against the inner surface of the tank.

17. In apparatus as set forth in claim 15, wherein the shaping means is removably received in the bag when the bag is in the tank.

18. In apparatus as set forth in claim 15, wherein the shaping means comprises a basket-like member.

19. In apparatus as set forth in claim 18, wherein said member is comprised of a number of generally rigid wire segments coupled together in a frame-like construction, the member being removably receivable within the bag.

20. In apparatus as set forth in claim 18, wherein the tank has a tapered inner surface, the member having a number of inclined side segments substantially complemental to the inner surface of the tank.

21. In apparatus as set forth in claim 15, wherein the inner surface of the tank is substantially cylindrical, said shaping member comprising a basket-like member substantially complemental to the inner surface of the tank.

22. In apparatus as set forth in claim 21, wherein the upper end of the member comprises a split ring, and a clip for releasably holding the ends of the split ring away from each other, the split ring having a bias permitting the ring to expand to increase its diameter when the clip is released.

23. In apparatus as set forth in claim 15, wherein the tank has an interior bottom and a space below the bottom for receiving a heating oil, there being heating means within the space for heating the oil therewithin, and a baffle assembly in the space above the heating means for causing circulation of the oil when the oil is heated by the heating means.

24. In apparatus as set forth in claim 23, wherein said baffle assembly includes a pair of adjacent aligned baffles, one of the baffles being inclined at a first angle and the other baffle being inclined at a second angle, the angles being transverse to each other, whereby the oil in the space rising by convection will engage the lower surfaces of the baffles and be circulated along along a circumferential path within the space.

25. In apparatus as set forth in claim 15, wherein the tank has a bottom, and a quench coil in heat exchange relationship to the bottom, said coil adapted to receive a coolant for cooling the contents of the bag after evaporation of the solvent therefrom.

26. In apparatus as set forth in claim 25, wherein is included a secondary wall below the bottom of the tank to present a space for receiving the quench coil.

27. In apparatus as set forth in claim 15, wherein is included a reservoir adjacent to the tank, there being means for receiving evaporated solvent from the tank and condensing the solvent, said condensed solvent being receivable in the reservoir, and a coolant coil in the reservoir to cool the solvent therein to inhibit the tendency of the solvent to evaporate in the reservoir.

28. In apparatus as set forth in claim 27, wherein the coil in the reservoir is coupled with said receiving and condensing means, whereby the coolant flowing through the coil in the reservoir will be used to condense the vapor leaving the tank.

29. In apparatus as set forth in claim 1 or 15, wherein said bag is initially in the form of a planar sheet, said sheet being engageable by said shaping and holding means to form a bag-like configuration when the shaping and holding means is directed into the tank.

30. In apparatus as set forth in claim 35, wherein said sheet is of a heat resistant material selected from the group including Teflon and nylon.

* * * * *